Jan. 5, 1937.  F. J. WESTROPE  2,066,500
VEHICLE HEADER CONSTRUCTION
Filed March 17, 1933  2 Sheets-Sheet 1
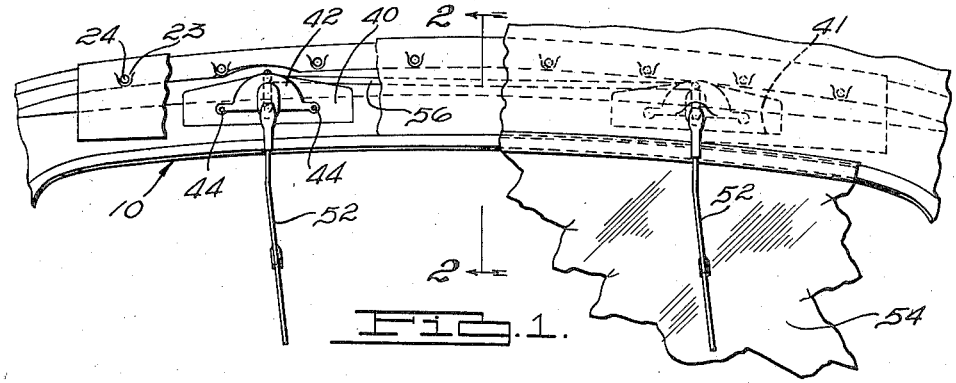
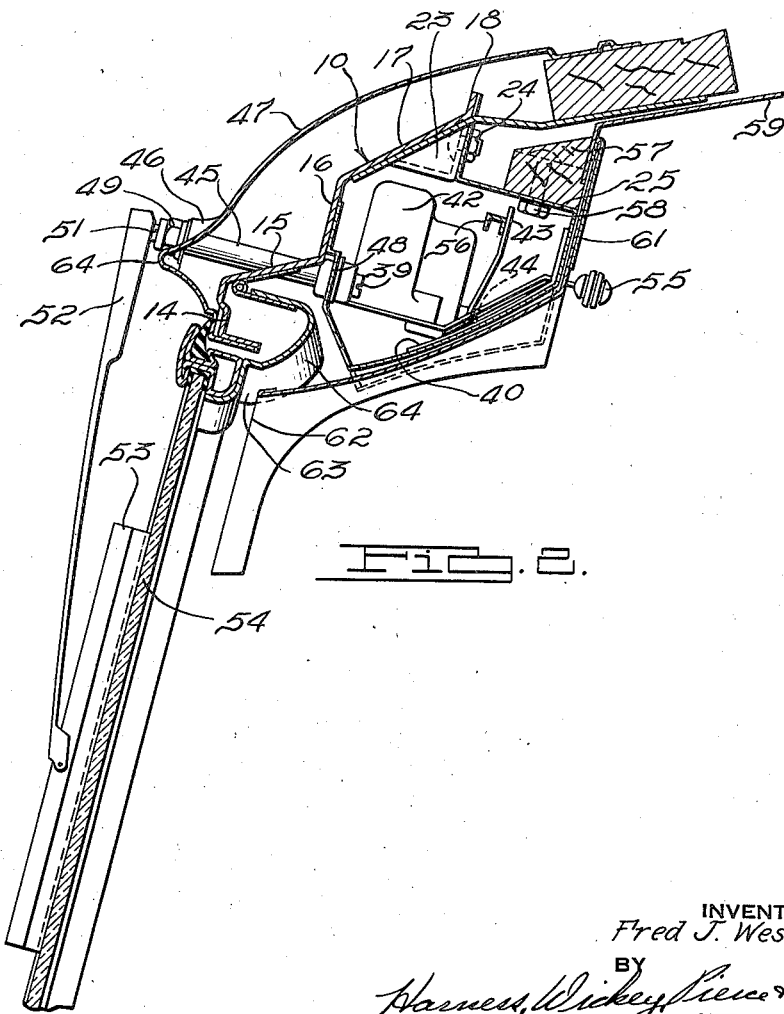
INVENTOR
Fred J. Westrope
BY
ATTORNEYS Jan. 5, 1937.  F. J. WESTROPE  2,066,500
VEHICLE HEADER CONSTRUCTION
Filed March 17, 1933   2 Sheets-Sheet 2
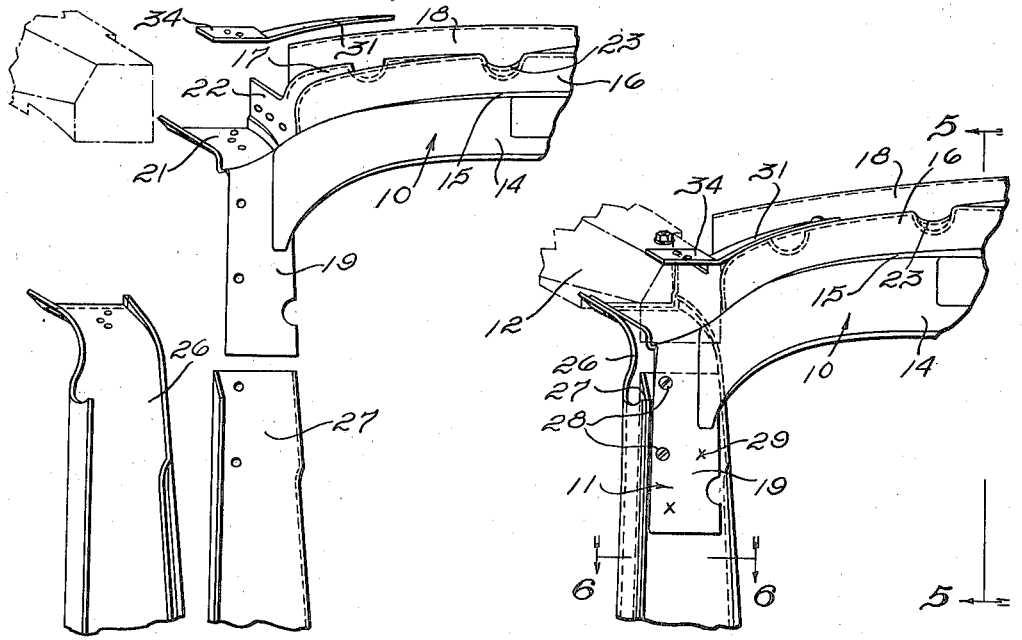
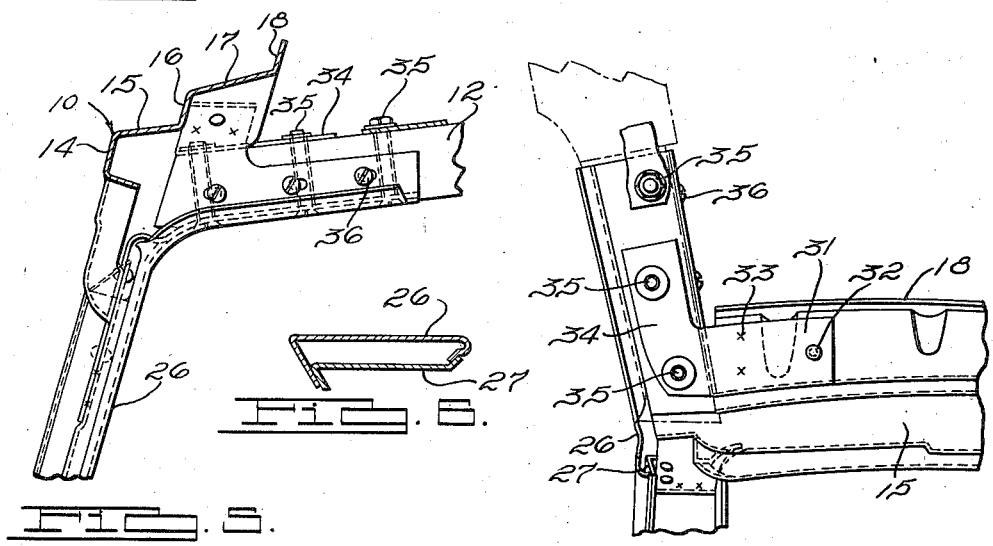
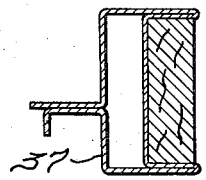
INVENTOR
Fred J. Westrope.
BY
ATTORNEYS Patented Jan. 5, 1937

2,066,500

UNITED STATES PATENT OFFICE 2,066,500

VEHICLE HEADER CONSTRUCTION

Fred J. Westrope, Detroit, Mich., assignor to The Murray Corporation of America, Detroit, Mich., a corporation of Delaware Application March 17, 1933, Serial No. 661,240

15 Claims. (Cl. 296—28)

My invention relates to vehicle bodies and particularly to the header construction therefor which is of box construction to provide strength thereto and to constitute a compartment for enclosing the windshield wiper motors.

In my copending application, Serial No. 521,194, filed March 9, 1931, I have illustrated and claimed a header for a vehicle body which was made from a single sheet of metal and preformed in such manner as to constitute a top bow for the vehicle, the header for the top edge of the windshield, and a recess between the bow and header for receiving the windshield wiper and for increasing the strength of the header construction in general. The header panel extended over the header structure and enclosed the windshield wiper motor element to provide a streamline and finish appearance to the top front portion of the vehicle body.

My present invention is an improvement of the header structure illustrated and described in my above mentioned copending application, and comprises a header which is of box section construction forming an enclosing housing for the windshield wiper motor and which is so constructed as to considerably strengthen the header structure, which is desirable. The header finish panel extends over the header and forms the upper rabbet at the windshield opening. The header panel is provided with a pressed out portion in the nature of a boss for receiving a supporting element for the windshield wiper driving shaft, which extends therethrough. The windshield wiper motor is screwed or otherwise supported to the box section structure and is relieved of the support of the wiper element in view of the supporting bushing mounted in the projection on the header panel. A windshield hinge is disposed between the inner and outer finish panels to support the windshield for outward swinging movement. The hinge is so constructed that it supports the windshield for swinging movement with the top edge arcuately shaped laterally of the vehicle.

Accordingly, the main objects of my invention are: to provide a header for a vehicle body which is made of metal and of box section construction to add strength thereto; to provide a header having a box section, which forms a housing for enclosing and supporting a windshield wiper motor; to provide a header panel extending over the header structure having a pressed out portion in the nature of a boss for receiving a bushing which constitutes a support for the windshield wiper shaft which extends therethrough; to provide interconnecting means for a pair of windshield wipers within the header structure to cause the motors to operate in unison; to provide a hinge for supporting a windshield for outward swinging movement, which hinge is disposed between the outer and inner finish panel; and, in general, to provide a header which is rigid in construction, which forms a compartment, and which is economical of manufacture.

Other objects and features of novelty of my invention will be either specifically pointed out or will become apparent when referring, for a better understanding of my invention to the following description in conjunction with the accompanying drawings, wherein, Figure 1 is a broken plan view of a header construction for a vehicle body which embodies features of my invention, Fig. 2 is an enlarged sectional view of the structure illustrated in Fig. 1, taken on the line 2—2 thereof, Fig. 3 is an exploded view of the elements which unite to form a corner section of the header structure, Fig. 4 is a view of the elements, illustrated in Fig. 3, in assembled relation, Fig. 5 is a sectional view of the structure illustrated in Fig. 4 taken on the line 5—5 thereof, Fig. 6 is a sectional view of the structure illustrated in Fig. 4 taken on the line 6—6 thereof.

Fig. 7 is a plan view of the structure illustrated in Fig. 4, and

Fig. 8 is a sectional view of a metal roof rail which may be employed with my header construction.

The header structure 10 extends across the top of the body between side pillars 11 and roof rails 12, all of which are joined together by welding, bolting, riveting or otherwise to form a unit header construction between the front pillars and the top side rails. The header structure 10 is made of sheet metal, constructed to have a front web 14 defining the margin of the windshield opening, a sloping portion 15, to the under side of which the hinge for the windshield is secured, the upstanding web portion 16, and the rearwardly sloping portion 17 which is flanged upwardly at 18. At the side edges, the web 14 is extended to form the downwardly sloping flanged portions 19 which are attachable to the pillars. The portions 19 extend rearwardly to join the portions 21 which form a connection between the pillars and roof rails and which are joined by the webs 22 to the portion 17 of the header. The pressed-in portion 23 in the sloping portion 17 is utilized for providing strength and also for receiving the bolts 24, as illustrated in Fig. 2, for supporting the enclosing housing 25, to form a box section with the header 10.

A front pillar element 26 forms the margin of the door and the windshield opening. The pillar element is welded to a reinforcing element 27 to form a section, as illustrated in Fig. 6 after the element 27 has been secured to the web 19 of the header by screws 28 and/or by welding when desired at points 29. An angle shaped strengthening corner plate 31 is bolted or riveted at 32 and/or welded at 33 and extends above the flange 21 of the header 10. The roof rail 12 is disposed to engage the webs 21 and 22 and the arm 34 of the angle member 31. Bolts 35 extend through the arm 34, roof rail 12, and web 21, while screws 36 extend through the web 22 into the roof rail.

In Fig. 8, I have illustrated a metal roof rail 37 which may be substituted for the wood roof rail 12 and which was described and illustrated in the co-pending application of A. H. Haberstump, Serial No. 635,617, filed September 30, 1932, and assigned to the assignee of the present invention. When the metal roof rail 37 is employed it may be welded directly to the flanges 21 and 22 and the arm 34 to form a unit structure therewith, eliminating the bolts and screws employed when the wooden rail is utilized.

The housing 25, forming the box section structure with the header 10, is provided with openings 40 and 41 through which a windshield wiper motor 42 may be inserted and is supported against the housing 25 by suitable screws 39. A sleeve or bushing 45 is provided between a boss 46 in a header finish panel 47 and an aperture 48 in the housing 25. The end of the bushing 45 is threaded and has a nut 49 screwed thereon for retaining it in fixed position. A motor shaft 51 extends through the bushing 45 and is driven by the motor to oscillate an arm 52, connected to a wiper element 53 which rests against the windshield glass 54. A suitable control handle 55 is provided extending inwardly of the inner finishing panel 61, for controlling the operation of the wiper motors. It will be understood that when two windshield wipers are employed, arms 43 are secured to the shafts 51 by screws 44 and are interconnected by a link 56 to cause the wipers to operate in unison.

A tacking strip 57 is secured to the upper flange of the housing 25 by bolts 58 to which the top finish material 59 and the inner header panel 61 is secured to provide a finished appearance to the inner header construction. The inner finish panel 61 extends adjacent to the windshield, to the point 62, leaving a space 63 therebetween for the operation of the windshield hinge 64 which has one wing secured to the inner side of web 15 of the header structure 10, the other end of which is secured to the frame of the windshield. The windshield frame is of lateral arcuate shape and is supported in this manner by the hinge for outward swinging movement.

The hinge is substantially hidden from view both from within and without the vehicle body, as are also the windshield wiper motors and their operating shafts. The motors and hinge are completely enclosed between the outer finish header panel 47 and the inner finish trim panel 61, which construction permits the rearwardly sloping windshield and header construction for producing the "bald headed" top effect to the vehicle for the purpose of streamlining the vehicle body. Above the windshield opening the outer finish panel 47 is deformed at 64 for the purpose of providing a drip molding above the windshield opening causing the water to run laterally thereof rather than directly downwardly over the windshield.

The header construction is new and novel in effecting the streamlining of the vehicle, and enclosing the windshield wiper motor and the windshield hinge between the inner and outer header finishing panels. The header structure is of box section and is preformed to have flanges which are welded to the pillar reinforcing members and thereafter to the pillars and which is extended to be connected to the roof rail either by welding, when a metal rail is employed, or by bolts when a wooden rail is utilized. The box section header construction not only encloses and hides from view the hinge and the wiper motors, but also considerably strengthens the header which is desirable, since any impact to the front end of the vehicle will be taken by the top header structure which must be provided with a large safety factor so as to prevent the driver or occupant of the front seat from being materially injured.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A header brace of closed box section construction for enclosing a windshield wiper motor, a panel encompassing the outer portion of the box section structure, spaced pillars secured to and supporting said panel and an inner panel forming a finish to the inner portion.

2. A header structure of closed box section for enclosing a windshield wiper motor, a panel encompassing the outer portion of the header structure, spaced pillars secured to and supporting said panel, an inner panel forming a finish to the inner portion thereof, and a hinge supported on said header structure outside of said box section but within the confines of the outer and inner finish panels.

3. A header construction for a vehicle body including in combination, a header element extending laterally of the vehicle and terminating in downwardly and rearwardly projecting flanges, pillar reinforcing members secured to the downwardly extending flanges, and pillars secured to the reinforcing members and to the rearwardly projecting flanges of the header element.

4. A header construction for a vehicle body including, in combination, a header element extending laterally of the vehicle and terminating in downwardly and rearwardly projecting flanges, pillar reinforcing members secured to the downwardly extending flanges, pillars secured to the reinforcing members and to the rearwardly extending flanges of the header element, and roof rails secured to the rearwardly extending flanges of the header element.

5. A header construction for a vehicle body including, in combination, a header element extending laterally of the vehicle and terminating in downwardly and rearwardly projecting flanges, pillar reinforcing members secured to the downwardly extending flanges, pillars secured to the reinforcing members and to the rearwardly extending flanges of the header element, roof rails secured to the rearwardly extending flanges of the header element, and means for interconnecting and bracing said rails and header structure.

6. A header construction for a vehicle body including, in combination, a header element of box section and extending laterally of the vehicle and terminating in downwardly and rearwardly projecting flanges, pillar reinforcing members secured to the downwardly extending flanges, pillars secured to the reinforcing members and to the rearwardly extending flanges of the header element, and roof rails secured to the header element at its sides and to the rearwardly extending flanges.

7. A header construction for a vehicle body including, in combination, a header element of box section and extending laterally of the vehicle and terminating in downwardly and rearwardly projecting flanges, pillar reinforcing members secured to the downwardly extending flanges, pillars secured to the reinforcing members and to the rearwardly extending flanges of the header element, roof rails secured to the header element at its sides and to the rearwardly extending flanges, and windshield wiper motors mounted within the box section structure of the header element.

8. In a vehicle body having front pillars and roof rails, a header element of closed box section supported between the front pillars and secured to the front end of the roof rails, inner and outer finish panels therefor encompassing said element, and a windshield wiper motor mounted within said box section structure.

9. In a vehicle body having front pillars, a header element of box section supported between the front pillars, inner and outer finish panels therefor encompassing said element, a windshield wiper motor mounted within said box section, a boss forward in the outer finish panel, and a bearing secured to said boss through which the windshield wiper shaft operates.

10. The combination with front paneling of a vehicle body having a windshield opening, of an outer finish panel sloped rearwardly from the plane of said windshield opening, of a pressed out boss on said panel, a bearing supported by said boss, a windshield wiper motor disposed inwardly of said header panel having a shaft which operates in said boss.

11. In a vehicle body having front pillars, a header structure of box section utilized as a brace between said front pillars, in combination, an outer finish panel extending over the outer surface of said box section secured to and supported on said pillars, an inner finish panel extending substantially over the inner surface of the box section, and a windshield hinge supported on the header structure outside of the box section but within the confines of the inner and outer finish panels.

12. In a vehicle body having front pillars, a header structure of box section utilized as a brace between said front pillars, in combination, an outer finish panel extending over the outer surface of said box section, an inner finish panel extending substantially over the inner surface of the box section, a windshield hinge supported on the header structure outside of the box section but within the confines of the inner and outer finish panels, and a windshield wiper motor mounted within the box section of the header structure.

13. A front top finish panel for a vehicle body of lateral arcuate shape and provided with a rabbeted portion forming the top edge of the windshield opening, said panel being frontwardly extended above said rabbet to provide a drip molding, at least one portion of said panel above said rabbet being preformed to provide a boss, and a bearing for a windshield wiper shaft supported in said boss.

14. A front top finish panel for a vehicle body of lateral arcuate shape and provided with a rabbeted portion forming the top edge of the windshield opening, said panel being frontwardly extended above said rabbet to provide a drip molding, at least one portion of said panel above said rabbet being preformed to provide a boss, and a bearing for a windshield wiper shaft supported in said boss, said panel being curved rearwardly from said portion forming the drip molding.

15. In a vehicle body construction a transversely extending windshield header of closed box section extending transversely above the windshield opening in said body, an outer finish panel sloped rearwardly from the top of said windshield opening, an aperture in said outer finish panel, a bearing in said aperture and a windshield wiper motor disposed inwardly of said outer finish panel, and having a shaft passing through the aperture in said outer finish panel and journaled in said bearing.

FRED J. WESTROPE.